United States Patent
Honda et al.

(10) Patent No.: US 8,022,682 B2
(45) Date of Patent: Sep. 20, 2011

(54) METHOD TO REDUCE INRUSH VOLTAGE AND CURRENT IN A SWITCHING POWER CONVERTER

(75) Inventors: Jun Honda, El Segundo, CA (US); Xiao-chang Cheng, San Jose, CA (US)

(73) Assignee: International Rectifier Corporation, El Segundo, CA (US)

( * ) Notice: Subject to any disclaimer, the term of this patent is extended or adjusted under 35 U.S.C. 154(b) by 382 days.

(21) Appl. No.: 11/741,070

(22) Filed: Apr. 27, 2007

(65) Prior Publication Data

US 2007/0252566 A1    Nov. 1, 2007

Related U.S. Application Data

(60) Provisional application No. 60/796,734, filed on May 1, 2006.

(51) Int. Cl.
*G05F 1/00* (2006.01)
(52) U.S. Cl. .......................... 323/284; 323/901; 323/908
(58) Field of Classification Search .............. 330/207 A, 330/251; 363/49; 323/284, 901, 908
See application file for complete search history.

(56) References Cited

U.S. PATENT DOCUMENTS

| | | | |
|---|---|---|---|
| 7,224,218 B1 * | 5/2007 | Jiang et al. | 330/10 |
| 7,312,654 B2 * | 12/2007 | Roeckner et al. | 330/10 |
| 7,385,379 B2 * | 6/2008 | Aioanei | 323/284 |
| 2005/0090922 A1 * | 4/2005 | Kinoshita | 700/108 |

* cited by examiner

*Primary Examiner* — Harry Behm
*Assistant Examiner* — Matthew Grubb
(74) *Attorney, Agent, or Firm* — Farajami & Farajami LLP (57) ABSTRACT

A circuit for minimizing voltage inrush upon startup in a switching power converter having a switching stage including high and low switches connected at a common node, a feedback loop for maintaining a target output voltage, an output capacitor connected between an output node and the ground, an inductor connected between the common node and the output node, and a control circuit having a first error amplifier for providing a first signal based on a comparison of a reference voltage and voltage provided by the feedback loop, the control circuit including a level switch connected between the ground and the common node, the level switch being controlled in accordance with the first signal, wherein a large inrush current flowing into the output capacitor when the circuit is starting up is minimized.

19 Claims, 7 Drawing Sheets

METHOD TO REDUCE INRUSH VOLTAGE AND CURRENT IN A SWITCHING POWER CONVERTER

CROSS-REFERENCE TO RELATED APPLICATION

This application is based on and claims priority to U.S. Provisional Patent Application Ser. No. 60/796,734, filed on May 1, 2006 and entitled A METHOD TO REDUCE INRUSH VOLTAGE AND CURRENT IN A SWITCHING POWER CONVERTER, the entire contents of which are hereby incorporated by reference herein.

BACKGROUND OF THE INVENTION

The present invention relates to eliminating voltage transition causing audible click noises in Class D audio power amplifier having a single power supply and more particularly to minimizing current or voltage inrush upon startup in switching power converters.

Figure 1:
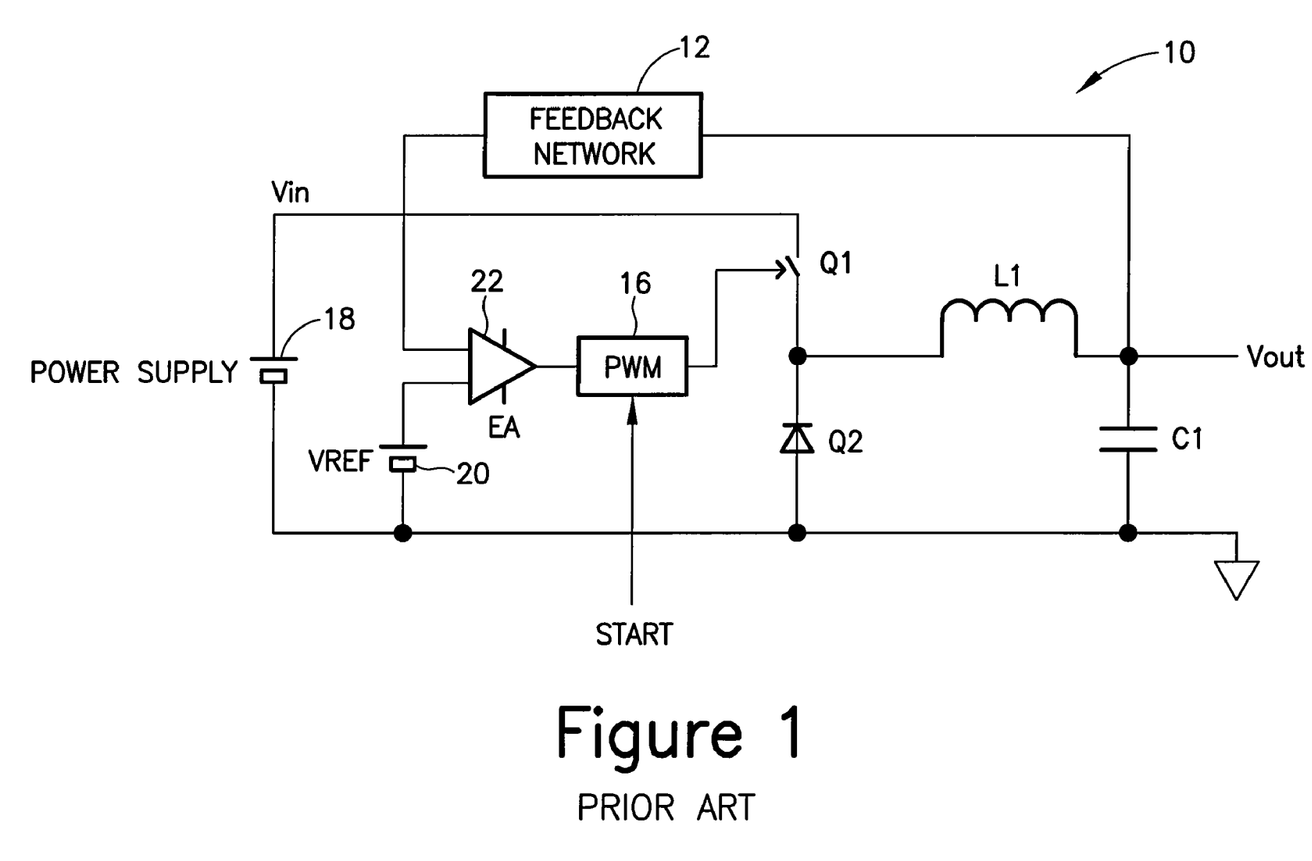
FIG. 1 is a diagram of a conventional switching power converter.

As illustrated in FIG. 1, in switching power converters 10 having a feedback loop 12 for maintaining output voltage and target output voltage other than 0V, there is a large inrush current flowing into output capacitors C1 when a switching power converter 10 is starting up. The switching power converter 10 includes a power supply 18 for providing input voltage $V_{IN}$; a reference voltage supply 20; an error amplifier 22 operating on output voltage from an output node, the output voltage being provided by the feedback loop 12, and the reference voltage; an output control device 16 for controlling a high switch Q1 of a switching stage having the high switch Q1 connected to a low switch Q2 at a common node; an inductor L1 connected between the common node and the output node; and the output capacitor C1 connected between the output node and the ground. The low switch Q2 of the switching stage is illustrated as a diode.

Figure 2:
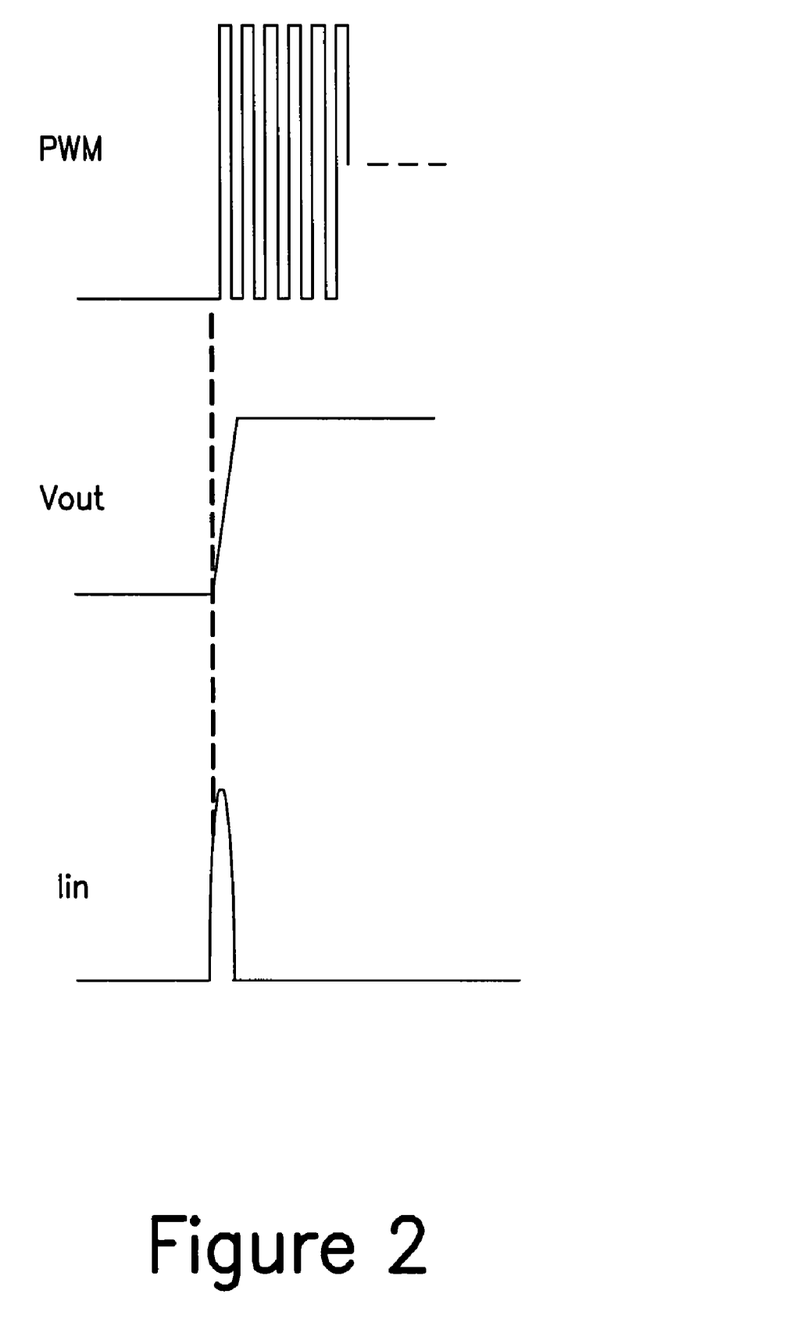
FIG. 2 is a graph of signals produced by the conventional switching power converter of FIG. 1 during an initial current transition.

The inrush current flow happens because of a nature of the feedback loop 12. As illustrated in FIG. 2, during an initial current transition, the control loop 12 forces an output control device 16 to output a maximum amount of current into the output capacitors C1.

One way to reduce the inrush current is to implement a current limit. However, necessity of a current sensing device which is also required for carrying rated current, makes this solution bulky and expensive.

Another way to minimize the inrush current is to implement soft start PWM. This method is difficult to implement into a control scheme with self-oscillating PWM due to modulation index limitations. For this solution the output voltage needs to be started from a certain voltage level.

SUMMARY OF THE INVENTION

A circuit is provided for minimizing voltage inrush upon startup in a switching power converter having a switching stage including high and low switches connected at a common node, a feedback loop for maintaining a target output voltage, an output capacitor connected between an output node and the ground, an inductor connected between the common node and the output node, and a control IC having a first error amplifier for providing a first signal based on a comparison of a reference voltage and voltage provided by the feedback loop, the IC including a level switch connected between the ground and the common node, the level switch being controlled in accordance with the first signal, wherein a large inrush current flowing into the output capacitor when the circuit is starting up is minimized.

Other features and advantages of the present invention will become apparent from the following description of the invention that refers to the accompanying drawings.

DETAILED DESCRIPTION OF EMBODIMENTS OF THE INVENTION

The present invention provides a pre-charging process to the output capacitor C1 without turning ON the switching device Q1. Therefore, PWM can start immediately without having an inrush current.

Figure 3:
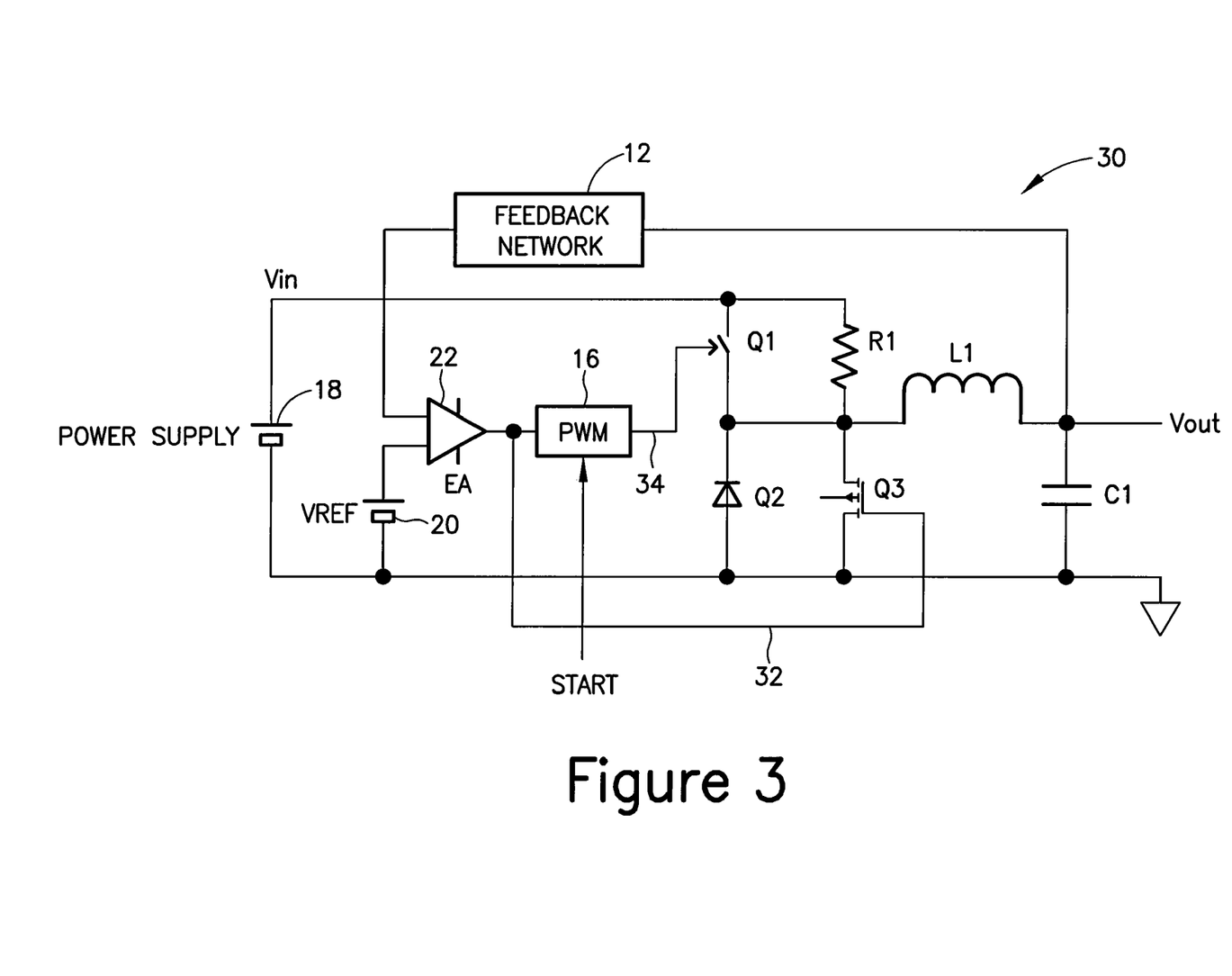
FIG. 3 is a diagram an embodiment of a switching power converter of the present invention including a pre-charging feedback loop.

FIG. 3 illustrates the pre-charging circuit 30 of the present invention. The circuit 30 includes a power supply 18; a reference voltage source 20; a feedback loop 12, which usually consists of a voltage divider; at least one charging-discharging device Q3 and an error amplifier 22. The at least one charging-discharging Q3 devices is controlled by the error amplifier 22. The error amplifier 22 can be the same circuit as the one used in normal operation of the circuit 10 of FIG. 1.

Figure 4:
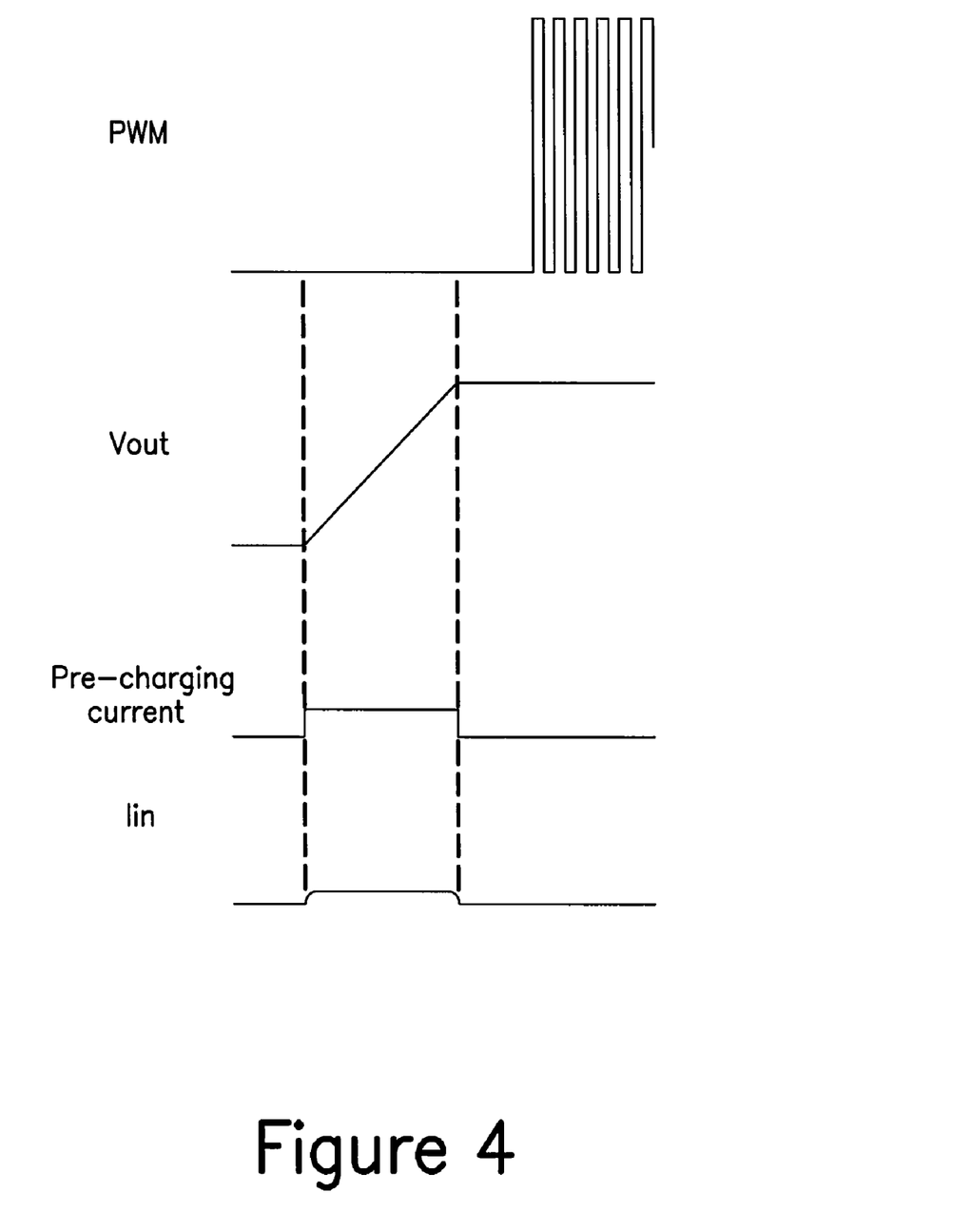
FIG. 4 is a graph of signals produced by the switching power converter of FIG. 3 during an initial current transition.

By using the same reference voltage 20 and feedback loop 12 for both pre-charging feedback loop 32 and the normal PWM operation loop 34, the target voltage of the pre-charging loop 32 can be the exactly same voltage as in the regular PWM operation. This, as illustrated in FIG. 4, results in a minimum amount of inrush current.

In Class D audio amplifier applications, to avoid a DC current flowing into the voice coil, an amplifier running with a single power supply requires a DC blocking capacitor coupled in series with a speaker. In the description above, this capacitor was referenced as the output capacitor C1. When the amplifier is turned on for the first time, the power amplifier quickly charges the DC blocking capacitor C1. A large amount of the current charging the DC blocking capacitor C1 flows into the loudspeaker as well. This causes a large start-up noise.

Figure 5:
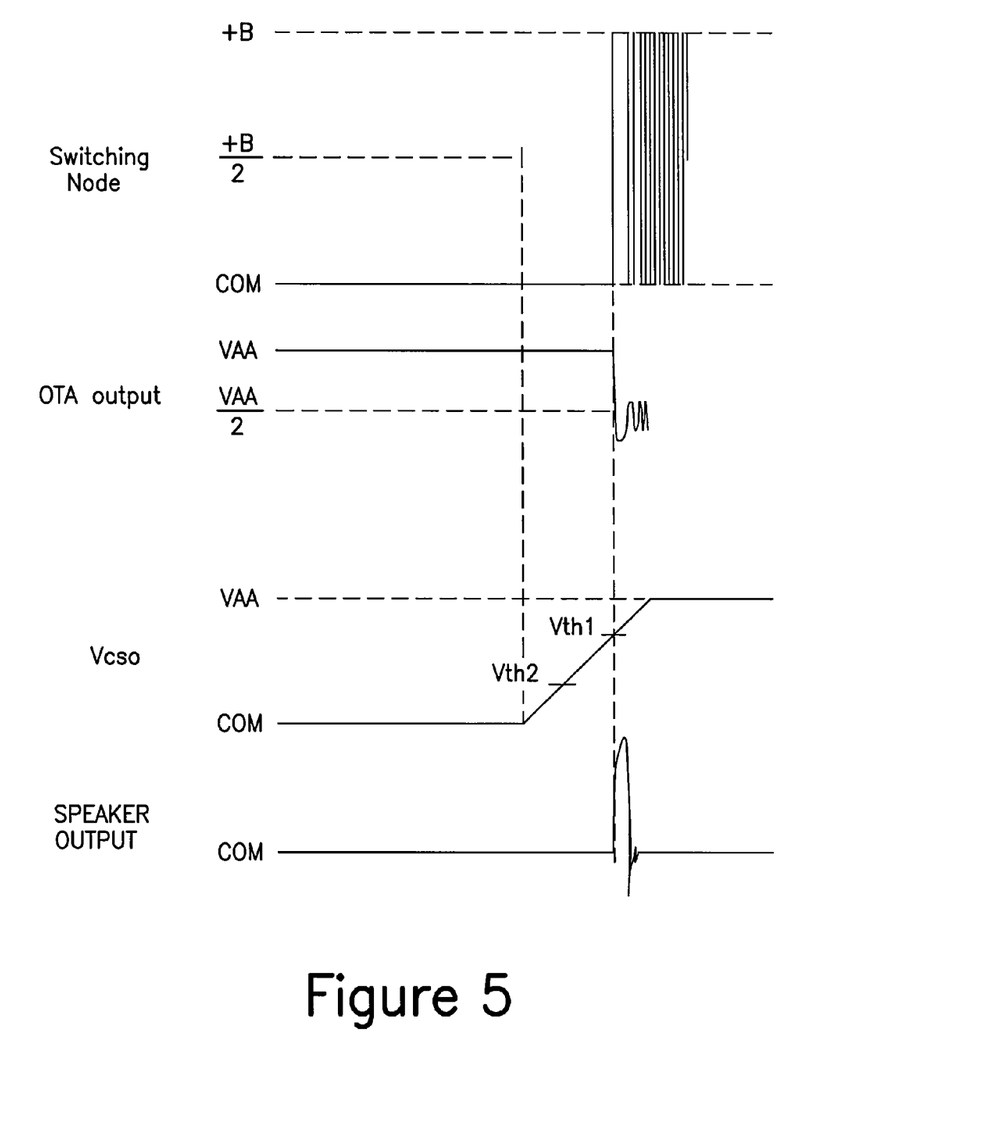
FIG. 5 is a graph of signals produced in a Class D audio amplifier having click noise during an initial current transition.

FIG. 5 illustrates waveforms that demonstrate signals produced by the switching power converter without the start-up sequence of the present invention being implemented. As illustrated the speaker output creates noise when voltage $V_{CSO}$ (see FIG. 6) at the common node reaches a threshold level $V_{TH1}$. As soon as PWM starts oscillation, a large charging current to the output DC blocking capacitor creates a large voltage transition across the speaker. In addition to this, an input and integration capacitors are trying to settle down to their steady state voltages which also requires some time, causing uneven PWM waveforms at initial PWM start up.

Figure 6:
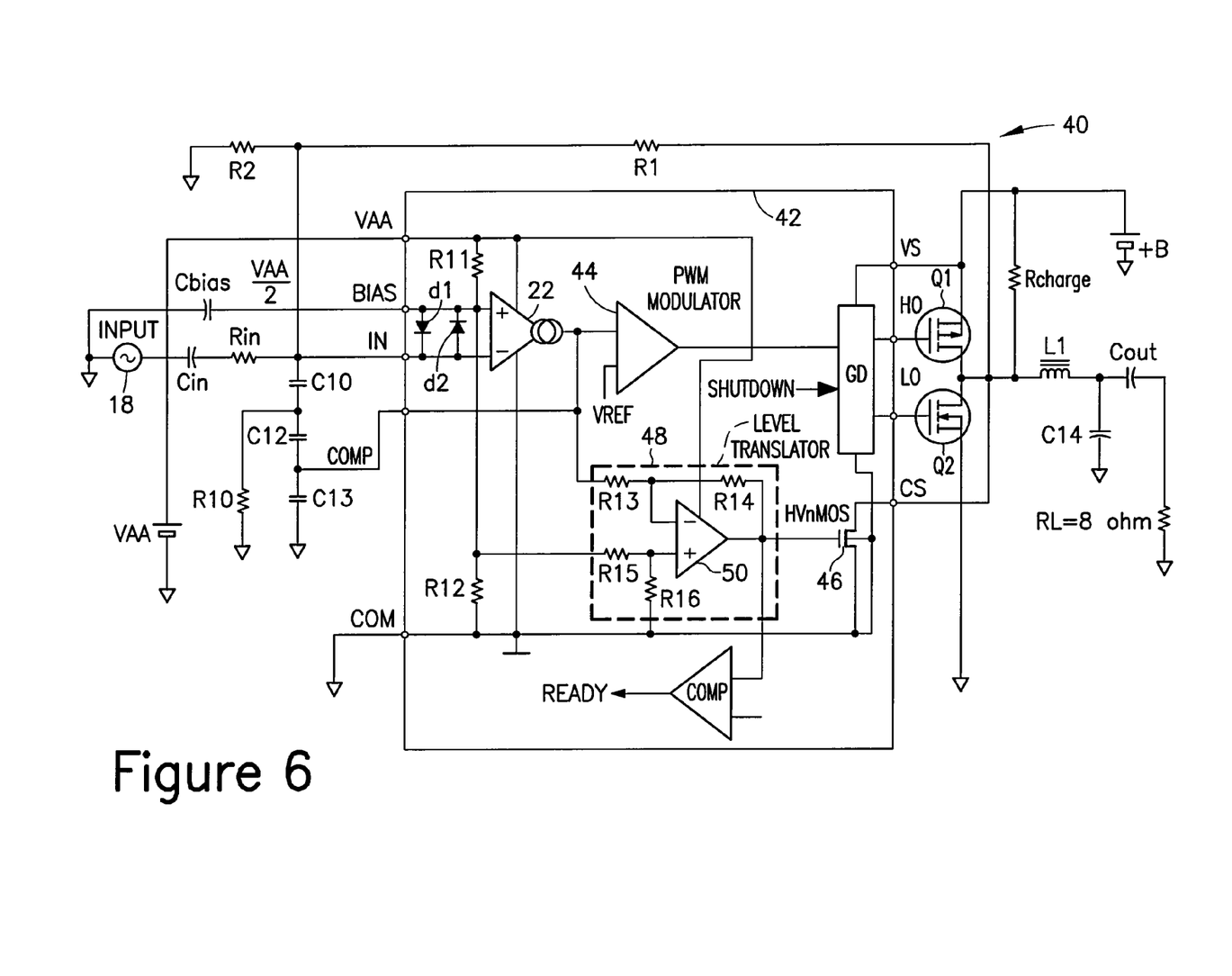
FIG. 6 is a diagram of a Class D audio amplifier including pre-charging feedback loop circuitry of the present invention.
Figure 7:
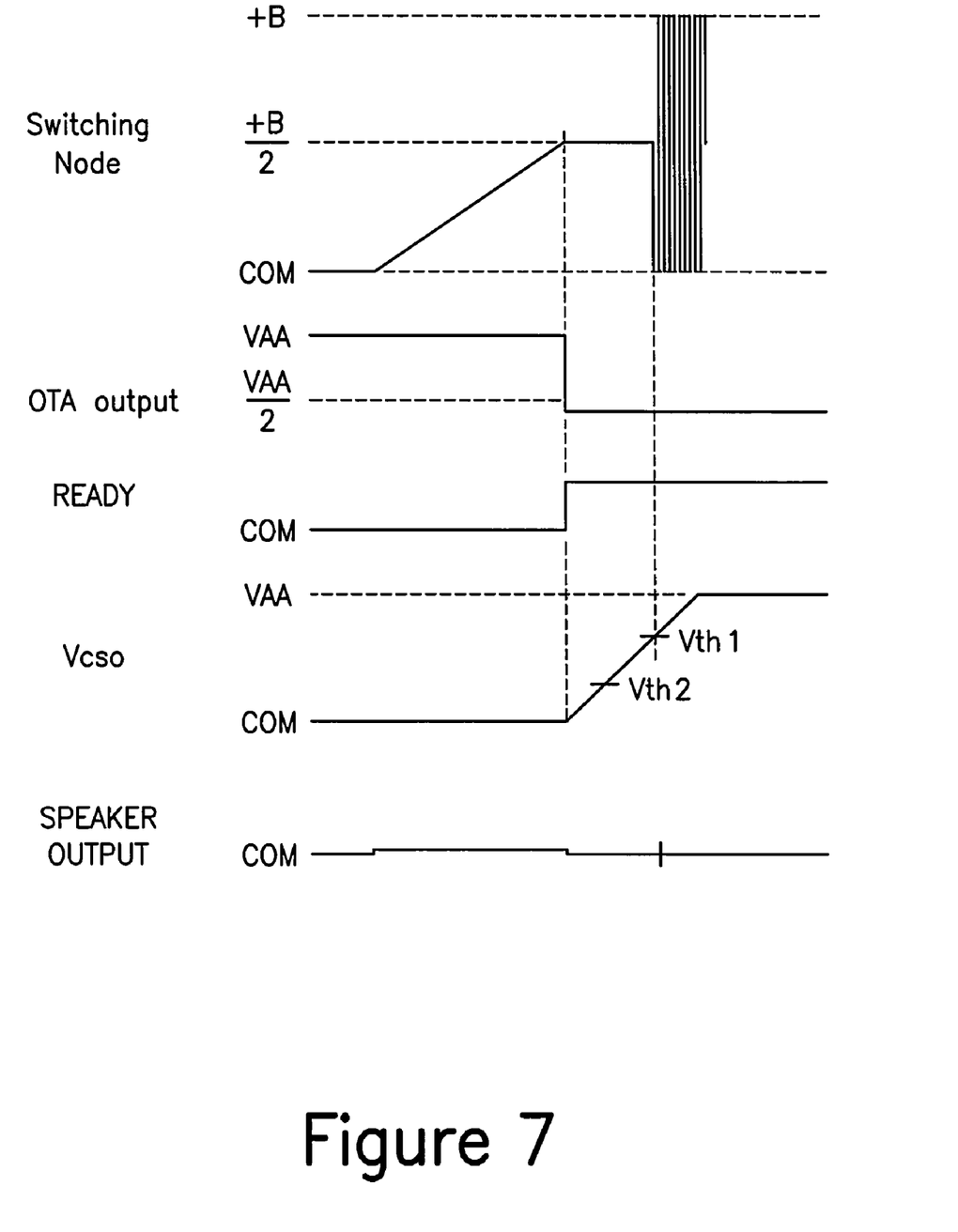
FIG. 7 is a graph of signals produced in the Class D audio amplifier of FIG. 6.

As illustrated in FIG. 6, the present invention teaches an integrated circuit 42, that may be used with a Class D audio amplifier circuit 40. In addition to the IC 42, the circuit 40 comprises an input power supply connected to pin IN of the IC 42 via series coupled capacitor $C_{IN}$ and resistor $R_{IN}$ and to pin BIAS of the IC 42 via a capacitor $C_{BIAS}$; a reference voltage source VAA connected to pin VAA of the IC 42; a feedback loop including voltage divider resistors R1 and R2 connected to pin IN; series coupled capacitors C10 and C12 connected between pins COMP and IN of the IC 42; a capacitor C13 connected between pin COMP of the IC 42 and the ground; a switching stage having High and Low switches Q1 and Q2 connected to a common node connected to pin CS of the IC 42, a gate terminal of the switch Q1 being connected to pin HO and a gate terminal of the switch Q2 being connected to pin LO of the IC 42; a voltage source +B connected to a source terminal of the switch Q1, the source terminal of the switch Q1 is connected to pin VS of the IC 42; a resistor $R_{charge}$ connected between the common node and the source of the switch Q1; inductor L1; capacitors C14 and $C_{OUT}$; and a resistor RL.

The IC 42 includes a gate driver GD for sensing voltage at pin VS and connecting to pins HO and LO for driving the High and Low switches Q1 and Q2 of the switching stage; an error amplifier 22 connected between voltage at pin VAA and the ground voltage at pin COM and receiving positive input from pin BIAS and negative input from pin IN. Diodes D1 and D2 are connected between pins BIAS and IN such that cathode of diode D1 and anode of diode D2 are connected at pin IN. The voltage from the source VAA is also coupled to the positive input terminal of the error amplifier 22 through a resistor R11. The error amplifier 22 provides a signal to a comparator 44 which produces and forward PWM signals to the gate driver GD for switching the switches Q1 and Q2 of the switch stage.

The IC 42 comprises a separate control loop and control means to maintain input and output voltages before starting regular PWM. Additional charging-discharging means 46 to the output DC blocking capacitor $C_{OUT}$. The charging-discharging means 46 is controlled by the error amplifier 22 through a level translator 48 including an error amplifier 50 and resistors R13-R16.

In the first phase of operation, a small current source charges the output capacitor slowly in open loop. When the voltage at switching node reaches the target value which determined by the resistive divider R1, R2 and voltage at pin BIAS, the error amplifier 22 turns on a MOSFET 46 to allow the voltage to settle down to a target value. By detecting the activation of MOSFET, this start up sequence goes into the next phase to kick off PWM oscillation.

The present invention avoids large initial start-up noise because all the related capacitors such as output capacitor, input capacitor, and integration capacitors are charged up the steady state voltages by the time the controller kicks off PWM oscillation.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A circuit for minimizing voltage inrush upon startup in a switching power converter having a switching stage comprising high and low switches connected at a common node, a feedback loop for maintaining a target output voltage, an output capacitor connected between an output node and the ground, an inductor connected between the common node and the output node, and a control circuit having a first error amplifier for providing a first signal based on a comparison of a reference voltage and voltage provided by the feedback loop, the control circuit comprising:
    a level switch connected between the ground and the common node, the level switch being controlled in accordance with the first signal;
    a resistor having a first terminal connected to a source of the high switch and a second terminal connected to a drain of the high switch and the common node;
    wherein a small current source pre-charges the output capacitor before a start of a PWM oscillation;
    wherein the first error amplifier turns ON the level switch when a voltage at the common node reaches the target output voltage.

2. The circuit of claim 1, wherein the switching power converter is a Class D audio power amplifier having a DC blocking capacitor, and voltage transition causing audible click noises is substantially reduced.

3. The circuit of claim 2, further comprising: a gate driver for driving the high and low switches; a PWM modulator circuit for receiving the first signal and providing a pulse to the gate driver; and a level translator circuit for receiving the first signal and controlling the level switch.

4. The circuit of claim 3, wherein the level translator circuit comprises a second error amplifier, the level translator circuit providing a second signal to the level switch and a comparator, the comparator providing a ready signal when voltage at the common node reaches a predetermined level.

5. The circuit of claim 3, wherein the output capacitor is pre-charged without turning on the switching.

6. The circuit of claim 3, wherein the IC comprises a separate control loop and a control means to maintain input and output voltages before the start of the PWM oscillation.

7. The circuit of claim 1, further comprising a small current source, wherein when the circuit is started, the small current source slowly charges the output capacitor in an open loop to the target output voltage.

8. The circuit of claim 7, further comprising a resistive divider for determining the target level.

9. The circuit of claim 1, wherein when the turning ON of the level switch is detected PWM oscillation is initiated.

10. The circuit of claim 1, wherein the target output voltage is equal to a steady state of an output DC offset.

11. The circuit of claim 10, wherein all capacitors in the feedback loop and an integration section of the circuit are pre-charged to the steady state value.

12. A control circuit for an amplifier, the control circuit comprising:
    a level switch coupled to a common node of a switching stage and a ground terminal;
    a small current source to pre-charge an output capacitor of the amplifier through a resistor before a start of a modulated signal in the amplifier;
    an error amplifier to turn ON the level switch when a voltage at the common node reaches a target voltage, thereby substantially reducing an inrush current into an output capacitor.

13. The control circuit of claim 12, wherein the resistor has a first terminal connected to a source of a high switch of the switching stage and a second terminal connected to a drain of the high switch and the common node.

14. The control circuit of claim 12, wherein the amplifier is a Class D amplifier.

15. The control circuit of claim 12, wherein the amplifier is an audio amplifier.

16. The control circuit of claim 12, further comprising a resistor divider to determine the target voltage.

17. The control circuit of claim 12, wherein the target voltage corresponds to an output direct current (DC) offset.

18. The control circuit of claim 12, wherein the modulated signal is a pulse width modulation (PWM) signal.

19. The control circuit of claim 12, further comprising a level translator circuit for controlling the level switch.

\* \* \* \* \*